United States Patent Office 3,636,049
Patented Jan. 18, 1972

3,636,049
ISOTHIOCHROMAN CARBOXAMIDES
James M. McManus, Old Lyme, Conn., assignor to
Pfizer Inc., New York, N.Y.
No Drawing. Filed Nov. 26, 1969, Ser. No. 880,396
Int. Cl. C07d 65/04
U.S. Cl. 260—327 TH     13 Claims

ABSTRACT OF THE DISCLOSURE

A series of novel 4-oxo-isothiochroman-3-carboxamide 2,2-dioxides have been prepared, including their pharmaceutically acceptable salts. These compounds are useful in therapy as non-steroidal anti-inflammatory agents. Alternate methods of preparation are provided and some of these synthetic routes are described in detail.

BACKGROUND OF THE INVENTION

This invention relates to new and useful isothiochroman carboxamides, and to their various novel methods of preparation. More particularly, it is concerned with a novel series of 4-oxo-isothiochroman - 3 - carboxamide 2,2-dioxides, which are of especial value in view of their chemotherapeutic properties.

In the past, various attempts have been made by numerous investigators in the field of organic medicinal chemistry to obtain new and useful anti-inflammatory agents. For the most part, these efforts have involved the synthesis and testing of various steroidal hormone compounds such as the corticosteroids. However, in the search for still newer and better anti-inflammatory agents, far less is known about the effect of non-steroidal agents in this area, albeit this would be attractive since they would also necessarily lack the untoward steroidal side-effects.

SUMMARY OF THE INVENTION

In accordance with the present invention, it has now been found that various novel isothiochroman carboxamide compounds, i.e., non-steroids, are surprisingly, extremely useful when employed in the field of drug therapy as anti-inflammatory agents. More specifically, the novel compounds of this invention are 4 - oxoisothiochroman-3-carboxamide 2,2,-dioxides of the formula:

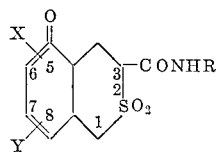

and the base salts thereof with pharmacologically acceptable cations, wherein X and Y are each a member selected from the group consisting of hydrogen fluorine, chlorine, bromine, alkyl and alkoxy each having from one to five carbon atoms, trifluoromethyl and trifluoromethoxy; and R is a member selected from the group consisting of naphthyl, phenyl, and mono- and di-substituted phenyl wherein each substituent is chosen from the group consisting of fluorine, chlorine and bromine, alkyl having up to four carbon atoms, alkoxy and thioalkoxy each having up to three carbon atoms, trifluoromethyl and trifluoromethoxy. These novel compounds are all useful in alleviating the painful effects caused by various inflammatory conditions.

Of especial interest in this connection are such typical member compounds of the invention as 4-oxo-isothiochroman-3-carboxanilide 2,2-dioxide,
2'-fluoro-4-oxo-isothiochroman-3-carboxanilide 2,2-dioxide,
2'-chloro-4-oxo-isothiochroman-3-carboxanilide 2,2-dioxide,
4'-chloro-4-oxo-isothiochroman-3-carboxanilide 2,2-dioxide,
3',4'-dichloro-4-oxo-isothiochroman-3-carboxanilide 2,2-dioxide,
2'-methyl-4-oxo-isothiochroman-3-carboxanilide 2,2-dioxide,
3'-methyl-4-oxoisothiochroman-3-carboxanilide 2,2-dioxide,
2'-methoxy-4-oxo-isothiochroman-3-carboxanilide 2,2-dioxide,
4'-methoxy-4-oxo-isothiochroman-3-carboxanilide 2,2-dioide and
4'-trifluoromethoxy-4-oxo-isothiochroman-3-carboxanilide 2,2-dioxide.

It is also to be understood that many of these compounds are tautomeric in nature and exist in the enolic form with respect to the 4-position of the molecule. All these compounds are extremely potent and possess antiinflammatory activity to a significantly high degree.

DETAILED DESCRIPTION OF THE INVENTION

In accordance with the process employed for preparing the novel compounds of this invention, an appropriately substituted 4-oxo-isothiochroman 2,2-dioxide compound of the formula:

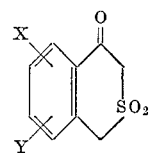

is contacted with an organic isocyanate reagent of the Formula RNCO wherein R corresponds to the previously defined organic nitrogen substituent on the carboxamide moiety of the desired final product. In this way, the corresponding 3-carboxamide (—CONHR) compound is formed where X and Y are both defined as previously indicated. This particular reaction is normally conducted in a basic solvent medium, most desirably employing a reaction-inert organic solvent such as tetrahydrofuran, dimethylsulfoxide or dimethylformamide and preferably using a slight excess in moles of a base, like triethylamine, which may be admixed with the solvent. Many of the aforesaid isocyanate reagents (RNCO) are either known compounds or else they can easily be prepared, using methods well-known to those skilled in the art, starting from readily available materials. In practice, it is usually preferable to employ at least about a molar equivalent of the isocyanate reagent in the instant reaction of the present invention, with best results often being achieved by using just a slight excess of same. Although any temperature below that of reflux may be used in order to effect the reaction, it is normally found most convenient to employ elevated temperatures in almost every case so as to shorten the required reaction time, which may range anywhere from several minutes up to about 24 hours depending, of course, upon the particular carboxamide compound actually being prepared. Upon completion of the reaction, the product is easily recovered from the spent reaction mixture by pouring same into an excess of ice-water containing a slight excess of acid, such as hydrochloric acid, whereby the carboxamide compound readily precipitates from solution and is subsequently collected by such means as suction filtration and the like.

Another method for preparing the instant compounds of this invention involves reacting a 4-oxo-isothiochroman 2,2-dioxide in the form of an alkali metal or alkaline-earth metal salt with an appropriate 1,1,3-trisubstituted urea of the formula $(R')_2NCONHR$, wherein $R'$ is an aryl group such as phenyl p-chlorophenyl, p-bromophenyl, p-nitrophenyl, p-acetylaminophenyl, p-tolyl, p-anisyl, α-naphthyl, β-naphthyl, and the like. This reaction is preferably carried out in the presence of a reaction-inert polar organic solvent medium. Typical organic solvents for use in this connection include the N,N-dialkyl lower alkanoamides like dimethylformamide, dimethylacetamide, diethylformamide and diethylacetamide, as well as lower dialkyl sulfoxides such as dimethyl sulfoxide, diethyl sulfoxide and di-n-propyl sulfoxide, etc. It is desirable that the aforesaid solvent for this reaction be present in sufficient amount to dissolve each of the previously mentioned starting materials. In general, the reaction is conducted at a temperature that is in the range of from about 20° C. up to about 150° C. for a period of about one-half to about ten hours. Recovery of the desired product from the reaction mixture is then most conveniently accomplished by first diluting the reaction solution with water and then adjusting the resulting aqueous solution to at least about pH 8.0, followed by subsequent extraction of the basic aqueous solution with any water-immiscible organic solvent in order to remove minor amounts of unreacted or excess starting material that might possibly be present at this stage. Isolation of the desired 4-oxo-isothiochroman-3-carboxamide 2,2-dioxide from the basic aqueous layer is then effected by the addition thereto of a dilute aqueous acid solution, wherein the acid is present to the extent that it will cause precipitation of the desired isothiochroman carboxamide to occur from said aqueous solution.

In connection with a more detailed consideration of the preferred method of synthesis of this invention, the relative amounts of reagents employed are such that the molar ratio of the 4-oxo-isothiochroman 2,2-dioxide to the 1,1-diaryl-3-(monosubstituted)urea is desirably in the preferred range of from about 1:1 to about 1:3, although substantially equimolar ratios will still cause equally satisfactory results to be achieved. Nevertheless, an excess of the trisubstituted urea is normally employed in this reaction since this not only serves to cause a shift in the reaction equilibrium to the product side of the equation, but it is also additionally advantageous in that the excess reagent is easily removed after completion of the reaction by means of the solvent extraction step previously referred to. Moreover, it is to be noted that the formation of the carboxamide final products of this invention is greatly enhanced by the overall basic character of the reaction mixture.

The two major type starting materials required for this reaction, viz, the 4-oxo-isothiochroman 2,2-dioxides and the 1,1-diaryl-3-(monosubstituted)-ureas, are both readily available to those skilled in the art. For instance, the 4-oxo-isothiochroman 2,2-dioxides, which are also used as starting materials in the previously described isocyanate method, are easily obtained by common methods of synthesis starting from the corresponding 4-oxo-isothiochromans and using oxidizing agents like hydrogen peroxide and potassium permanganate, etc., in accordance with standard organic procedure. The 1,1-diaryl-3-(monosubstituted)-ureas, on the other hand, are all readily prepared from common organic reagents by employing standard procedures well known in the art, e.g., the desired 1,1,3-trisubstituted urea may be prepared from the corresponding disubstituted carbamyl chloride $[(R')_2NCOCl]$ and the appropriate amine $(RNH_2)$ in accordance with the general procedure of Reudel, as described in Recueil des Travaux Chimiques des Pays-Bas, vol. 33, p. 64 (1914).

The chemical bases which are used as reagents in this invention to prepare the pharmaceutically acceptable salts of same are those which form non-toxic salts with the many herein described acidic 4-oxo-isothiochroman-3-carboxamide 2,2 - dioxides, such as 2'-chloro-4-oxo-isothiochroman-3-carboxanilide 2,2-dioxide, for example. These particular non-toxic base salts are of such a nature that their cations are said to be essentially non-toxic in character over the wide range of dosage administered. Examples of such cations include those of sodium, potassium, calcium and magnesium, etc. These salts can easily be prepared by simply treating the aforementioned 4-oxo-isothiochroman-3-carboxamide 2,2-dioxides with an aqueous solution of the desired pharmacologically acceptable base, i.e., those oxides, hydroxides or carbonates which contain pharmacologically acceptable cations, and then evaporating the resulting solution to dryness while preferably being placed under reduced pressure. Alternatively, they may also be prepared by mixing lower alkanolic solutions of the said acidic compounds and the desired alkali metal alkoxide together, and then evaporating said resulting solution in the same manner as before. In either case, stoichiometric amounts of reagents must be employed in order to ensure completeness of reaction, with consequent maximum production of yields of the desired pure product.

As previously indicated, the 4-oxo-isothiochroman-3-carboxamide 2,2-dioxide compounds of the present invention are all readily adapted to therapeutic use as anti-inflammatory agents, particularly in view of their ability to reduce the swelling and relieve the pain caused by arthritic and other inflammatory disorders that are normally associated with such basic ailments as rheumatoid arthritis and the like. For instance, 4-oxo-isothiochroman-3 - carboxanilide 2,2-dioxide and 2'-methoxy-4-oxo-isothiochroman-3-carboxanilide 2,2-dioxide, both typical and preferred agents of the present invention, exhibit remarkable activity in the standard carrageenin-induced rat foot edema test [described by C. A. Winter et al., Proc. Soc. Exp. Biol., vol. 111, p. 544 (1962)], where it was found that both compounds cause almost a 30% inhibition at the 33 mg./kg. dose level. More specifically, 4-oxo-isothiochroman-3-carboxanilide 2,2-dioxide and 2'-methoxy-4 - oxo-isothiochroman-3-carboxanilide 2,2-dioxide have been found to exhibit their non-steroidal therapuetic effect in rats when tested orally at levels ranging from 0.33–33 mg./kg., with both compounds still retaining their extremely potent anti-inflammatory activity in adrenalectomized animals to a significantly high degree. Additionally, none of these compounds cause substantial side effects to occur in the subject to whom they are so administered, i.e., no problems of toxicity or of a harmful pharmacological nature, either gross or microscopic, are encountered when said compounds are administered for the aforestated purposes in the manner described as indicated above.

In accordance with a method of treatment of the present invention, the herein described 4-oxo-isothiochroman-3-carboxamide 2,2-dioxide anti-inflammatory agents can be administered to an afflicated subject via either the oral or parenteral routes of administration. In general, these compounds are most desirably administered in doses ranging from about 10 mg. up to about 1000 mg. per day, although variations will still necessarily occur depending upon the weight of the subject being treated. However, a dosage level that is in the range of from about 0.16 mg. to about 16 mg. per kg. of body weight per day is most desirably employed in order to achieve effective results. Nevertheless, it is still to be appreciated that other variations may also occur in this respect, depending upon the species of animal being treated and its individual response to said medicament, as well as on the particular type of pharmaceutical formulation chosen and the time period and interval at which such administration is carried out. In some instances, dosage levels below the lower limit of the aforesaid range may be more than adequate, while in other cases still larger doses may be employed without causing any harmful or deleterious side effects to occur provided that such higher dose levels are first divided into several smaller doses that are to be administered throughout the day.

In connection with the use of the 4-oxo-isothiochroman-3-carboxamide 2,2-dioxide compounds of this invention for the treatment of arthritic subjects, it is to be noted that they may be administered either alone or in combination with pharmaceutically acceptable carriers by either of the routes previously indicated, and that such administration can be carried out in both single and multiple dosages. More particularly, the novel compounds of the invention can be administered in a wide variety of different dosage forms, i.e., they may be combined with various pharmaceutically-acceptable inert carriers in the form of tablets, capsules, lozenges, troches, hard candies, powders, sprays, creams, salves, suppositories, jellies, pastes, lotion, ointments, aqueous suspensions, injectable solutions, elixirs, syrups, and the like. Such carriers include solid diluents or fillers, sterile aqueous media and various non-toxic organic solvents, etc. Moreover, such oral pharmaceutical compositions can be suitably sweetened and/or flavored by means of various agents of the type commonly employed for just such a purpose. In general, the therapeutically-effective compounds of this invention are present in such dosage forms at concentration levels ranging from about 0.5% to about 90% by weight of the total composition, i.e., in amounts which are sufficient to provide the desired unit dosage.

For purposes of oral administration, tablets containing various excepients such as sodium citrate, calcium carbonate and dicalcium phosphate may be employed along with various disintegrants such as starch and preferably potato or tapioca starch, alginic acid and certain complex silicates, together with binding agents such as polyvinylpyrrolidone, sucrose, gelatin and acacia. Additionally, lubricating agents such as magnesium stearate, sodium lauryl sulfate and talc are often very useful for tabletting purposes. Solid compositions of a similar type may also be employed as fillers in soft and hard-filled gelatin capsules; preferred materials in the connection would also include lactose or milk sugar as well as high molecular weight polyethylene glycols. When aqueous suspensions and/or elixirs are desired for oral administration, the essential active ingredient therein may be combined with various sweetening or flavoring agents, coloring matter or dyes, and, if so desired, emulsifying and/or suspending agents as well, together with such diluents as water, ethanol, propylene glycol, glycerin and various like combinations thereof.

For purposes of parenteral administration, solutions of these particular 4-oxo-isothiochroman-3-carboxamide 2,2-dioxides in either sesame or peanut oil or in aqueous propylene glycol may be employed, as well as sterile aqueous solutions of the corresponding water-soluble alkali metal or alkaline-earth metal salts previously enumerated. Such aqueous solutions should be suitably buffered if necessary and the liquid diluent first rendered isotonic with sufficient saline or glucose. These particular solutions are especially suitable for intravenous, intramuscular and subcutaneous injection purposes. Additionally, it is also possible to administer the aforesaid isothiochroman carboxamide compounds topically when treating inflammatory conditions of the skin and this may be preferably done by way of creams, slaves, jellies, pastes, ointments and the like, in accordance with standard pharmaceutical practice.

A general procedure employed for detecting and comparing the antiinflammatory activity of the compounds of the present invention is, as previously indicated, the standard carrageenin-induced rat food edema test using the aforementioned technique of C. A. Winter et al. In this test, antiinflammatory activity is determined as the inhibition of edema formation in the hind paw of male albino rats (weighing 150–190 g.) in response to a subplantar injection of carrageenin. The carageenin is injected as a 1% aqueous suspension (0.05 ml.) one hour after oral administration of the drug in the form of an aqueous solution. Edema formation is then assessed three hours after the carrageenin injection by measuring the volume of the injected paw initially as well as at the three-hour mark. The increase in volume three hours after carrageenin injection constitutes the individual response. Compounds are considered active if the response between the drug-treated animals (six rats/group) and the control group (i.e., animals receiving the vehicle alone) is deemed to be significant on comparison with standard compounds like acetylsalicylic acid at 100 mg./kg. or phenylbutazone at 33 mg./kg., both by the oral route of administration.

EXAMPLE I

A solution consisting of 14.0 g. (0.09 mole) of potassium permanganate dissolved in 215 ml. of warm water was prepared and subsequently added to 9.0 g. (0.054 mole) of 4-oxo-isothiochroman [A. K. Kiang et al., Journal of the Chemical Society (London), p. 1909 (1951)] dissolved in 61 ml. of glacial acetic acid. Constant agitation was maintained throughout the addition step, with the temperature of the reaction mixture being kept within the 10–15° C. range. Upon completion of the addition, the mixture was stirred for a further ten minutes at ambient temperatures and then treated with a saturated solution of aqueous sodium bisulfite to permit neutralization of excess permanganate. The brown precipitate which formed at this point was subsequently collected by means of suction filtration and dried in an oven to constant weight. After recrystallizing the crude material from chloroform in the presence of activated carbon, there were ultimately obtained 5.29 g. (50%) of pure 4-oxoisothiochroman 2,2-dioxide, M.P. 158–160° C.

*Analysis.*—Calcd. for $C_9H_8O_3S$ (percent): C, 55.09; H, 4.11. Found: C, 54.77; H, 4.10.

EXAMPLE II

The procedure described in Example I is repeated to prepare the following 4-oxo-isothiochroman 2,2-dioxides, starting from the corresponding 4-oxo-isochroman compound and using potassium permanganate as the oxidizing reagent in each case:

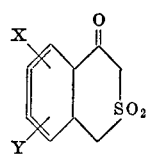

| X | Y |
|---|---|
| 6-$OC_2H_5$ | 7-$OC_2H_5$ |
| 6-Cl | H |
| 6-Cl | 7-F |

TABLE.—Continued

| X | Y |
|---|---|
| 5-C₂H₅ | H |
| 6-Cl | 7-Cl |
| 6-C₂H₅ | 7-C₂H₅ |
| 5-OCF₃ | H |
| H | 7-OCH₃ |
| 6-Br | 7-Br |
| 5-F | H |
| 5-(n-C₄H₉) | H |
| 6-OC₂H₅ | H |
| H | 8-OCF₃ |
| 6-F | H |
| 6-CH₃ | 7-CH₃ |
| 6-OCH₃ | 7-OCH₃ |
| H | 8-Cl |
| 5-CH₃ | H |
| H | 8-(n-C₄H₉) |
| 6-OC₅H₁₁(n) | 7-OC₅H₁₁(n) |
| 5-(n-C₅H₁₁) | H |
| 5-Cl | 8-Cl |
| H | 7-CF₃ |
| 6-F | 7-F |
| 5-Cl | H |
| 5-Br | H |
| 6-CF₃ | 7-CF₃ |
| 5-CF₃ | H |
| H | 7-OC₅H₁₁(n) |
| 6-(n-C₅H₁₁) | 7-(n-C₅H₁₁) |
| 6-OCF₃ | 7-OCF₃ |
| 5-OCH₃ | H |
| H | 7-F |
| 6-Br | H |

EXAMPLE III

To a well-stirred mixture consisting of 1.96 g. (0.01 mole) of 4-oxoisothiochroman 2,2-dioxide and 1.01 g. (0.01 mole) of triethylamine in 12 ml. of tetrahydrofuran, there were added 1.68 g. (0.011 mole) of o-chlorophenyl isocyanate with constant agitation being maintained throughout the addition step. The resulting reaction mixture was then refluxed for five hours, cooled to room temperature (~25° C.) and filtered. The solid triethylamine salt obtained as filter cake was subsequently dissolved in hot water and thereafter acidified (as a solution) at room temperature with dilute hydrochloric acid to pH 4.0. The crystalline precipitate which formed at this point was then collected by means of suction filtration and air-dried to constant weight to give 2.65 g. (76%) of 2'-chloro-4-oxo-isothiochroman-3-carboxanilide 2,2-dioxide, M.P. 198–200° C. after recrystallization from toluene.

*Analysis.*—Calcd. for C₁₆H₁₂ClNO₄S (percent): C, 54.93; H, 3.46; N, 4.00. Found (percent): C, 55.17; H, 3.54; N, 4.07.

EXAMPLE IV

The procedure described in Example III was repeated to prepare the following 4-oxo-isothiochroman-3-carboxanilide 2,2-dioxides, starting from the corresponding 4-oxo-isothiochroman 2,2-dioxide and appropriate phenyl, tosyl or anisyl isocyanate reagent in each case:

4-oxo-isothiochroman-3-carboxanilide 2,2-dioxide, M.P. 158–159.5° C.

2'-fluoro-4-oxo-isothiochroman-3-carboxanilide 2,2-dioxide, M.P. 191–193° C.

4'-chloro-4-oxo-isothiochroman-3-carboxanilide 2,2-dioxide, M.P. 227–230° C.

3',4'-dichloro-4-oxo-isothiochroman-3-carboxanilide 2,2-dioxide, M.P. 215–218° C.

2'-methyl-4-oxo-isothiochroman-3-carboxanilide 2,2-dioxide, M.P. 178–179° C.

3'-methyl-4-oxo-isothiochroman-3-carboxanilide 2,2-dioxide, M.P. 172–173° C.

2'-methoxy-4-oxo-isothiochroman-3-carboxanilide 2,2-dioxide, M.P. 243–244° C.

4'-methoxy-4-oxo-isothiochroman-3-carboxanilide 2,2-dioxide, M.P. 189–190.5° C.

4'-trifluoromethoxy-4-oxo-isothiochroman-3-carboxanilide 2,2-dioxide, M.P. 187–188° C.

EXAMPLE V

The procedure described in Example III is employed once again to prepare the following 4-oxo-isothiochroman-3-carboxamide 2,2-dioxides, starting from the corresponding 4-oxo-isothiochroman 2,2-dioxide compound and appropriate organic isocyanate reagent in each case:

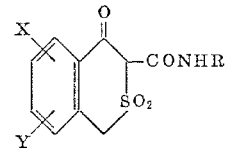

| X | Y | R |
|---|---|---|
| H | H | 2,4-difluorophenyl. |
| 6-OC₂H₅ | 7-OC₂H₅ | 3-bromophenyl. |
| 6-Cl | H | 2-CF₃ phenyl. |
| 6-Cl | 7-F | 2,5-dimethoxyphenyl. |
| H | H | 2-ethylphenyl. |
| 5-C₂H₅ | H | Phenyl. |
| 6-Cl | 7-Cl | α-Naphthyl. |
| 6-C₂H₅ | 7-C₂H₅ | β-Naphthyl. |
| 5-OCF₃ | H | 4-CF₃O phenyl. |
| H | 7-OCH₃ | 2-chlorophenyl. |
| 6-Br | 7-Br | 3-chlorophenyl. |
| 5-F | H | 4-chlorophenyl. |
| 5-(n-C₄H₉) | H | 2-methylphenyl. |
| 6-OC₂H₅ | H | 3-methylphenyl. |
| H | 8-OCF₃ | 4-methylphenyl. |
| 6-Cl | H | 2-methoxyphenyl. |
| H | H | 2-thioethoxyphenyl. |
| 6-F | H | 4-methoxyphenyl. |
| 6-CH₃ | 7-CH₃ | 2,5-dichlorophenyl. |
| 6-OCH₃ | 7-OCH₃ | 3,4-dimethylphenyl. |
| H | H | 2,5-dichlorophenyl. |
| H | 8-Cl | 4-(n-butyl)phenyl. |
| H | H | 3-CF₃ phenyl. |
| 6-Br | H | 3,5-difluorophenyl. |
| 5-CH₃ | H | 2,4-dimethoxyphenyl. |
| H | 8-(n-C₄H₉) | 2,5-dimethoxyphenyl. |
| H | H | 2-ethoxyphenyl. |
| 6-OC₅H₁₁(n) | 7-OC₅H₁₁(n) | 4-ethoxyphenyl. |
| H | H | 3-isopropoxyphenyl. |
| 6-F | H | Phenyl. |
| 5-(n-C₅H₁₁) | H | α-Naphthyl. |
| 5-Cl | 8-Cl | β-Naphthyl. |
| H | 7-CF₃ | 2-thiomethoxyphenyl. |
| 6-F | 7-F | 4-bromophenyl. |
| H | H | 4-fluorophenyl. |
| 5-Cl | H | 5-CF₃ phenyl. |
| 6-CF₃ | 7-CF₃ | 2,3-dichlorophenyl. |
| 6-Cl | H | 5-Cl-2-methoxyphenyl. |
| 6-Cl | 7-Cl | 3,5-dichlorophenyl. |
| 5-CF₃ | H | 3,5-dimethoxyphenyl. |
| H | H | 4-thiopropoxyphenyl. |
| H | 7-OC₅H₁₁(n) | 2,6-dimethylphenyl. |
| 6-(n-C₅H₁₁) | 7-(n-C₅H₁₁) | 2-CH₃O-5-methylphenyl. |
| H | H | 3-Cl-4-methylphenyl. |
| 6-OCF₃ | 7-OCF₃ | 2,4-dimethylphenyl. |
| 5-OCH₃ | H | 2-Cl-5-CF₃ phenyl. |
| H | 7-F | 3-CF₃O phenyl. |
| 6-Br | H | 2,4-difluorophenyl. |
| 6-Cl | 7-Cl | Phenyl. |
| H | H | 4-(n-butyl)phenyl. |
| H | H | 3-methoxyphenyl. |
| H | H | 2-CF₃O phenyl. |
| 5-Br | H | 2,5-difluorophenyl. |
| 5-Cl | 8-Cl | Phenyl. |
| H | H | 4-methylphenyl. |
| H | H | 4-CF₃ phenyl. |

EXAMPLE VI

The sodium salt of 2'-chloro-4-oxo-isothiochroman-3-carboxanilide 2,2-dioxide is prepared by dissolving said compound in anhydrous methanol and then adding said solution to another methanolic solution which contains an equivalent amount in moles of sodium methoxide. Upon subsequent evaporation of the solvent therefrom via freezing-drying, there is obtained the desired alkali metal salt in the form of an amorphous solid powder which is freely soluble in water.

In like manner, the potassium and lithium salts are also prepared as are the alkali metal salts of all the other acidic 4-oxo-isothiochroman-3-carboxamide 2,2-dioxides of this invention, which were reported previously in the preceding examples.

EXAMPLE VII

The calcium salt of 2'-methyl-4-oxo-isothiochroman-3-carboxanilide 2,2-dioxide is prepared by dissolving said compound in water containing an equivalent amount in moles of calcium hydroxide in then freeze-drying the mixture. The corresponding magnesium salt is also prepared in like manner, as are all the other alkaline-earth metal salts not only of this particular compound, but also of those acidic 4-oxo-isothiochroman-3-carboxamide 2,2-dioxides previously described in the examples immediately preceding Example VI.

EXAMPLE VIII

A dry solid pharmaceutical composition is prepared by blending the following materials together in the proportions by weight specified below:

| | |
|---|---|
| 4-oxo-isothiochroman-3-carboxanilide 2,2-dioxide | 50 |
| Sodium citrate | 25 |
| Alginic acid | 10 |
| Polyvinylpyrrolidone | 10 |
| Magnesium stearate | 5 |

After the dried composition is thoroughly blended, tablets are punched from the resulting mixture, each tablet being of such size that it contains 100 mg. of the active ingredient. Other tablets are also prepared in a similar manner containing 5, 10, 25 and 50 mg. of the active ingredient, respectively, by merely using the appropriate amount of the isothiochroman carboxamide compound in each case.

EXAMPLE IX

A dry solid pharmaceutical composition is prepared by combining the following materials together in the proportions by weight indicated below:

| | |
|---|---|
| 2'-methoxy-4-oxo-isothiochroman-3-carboxanilide 2,2-dioxide | 50 |
| Calcium carbonate | 20 |
| Polyethylene glycol, average molecular weight 4000 | 30 |

The dried solid mixture so prepared is then thoroughly agitated so as to obtain a powdered product that is completely uniform in every respect. Soft elastic and hard-filled gelatin capsules containing this pharmaceutical composition are then prepared, employing a sufficient quantity of material in each case so as to provide each capsule with 250 mg. of the active ingredient.

What is claimed is:
1. An isothiochroman carboxamide of the formula:

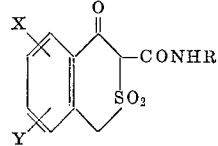

and the base salts thereof with pharmacologically acceptable cations, wherein X and Y are each a member selected from the group consisting of hydrogen, fluorine, chlorine, bromine, alkyl and alkoxy each having from one to five carbon atoms, trifluoromethyl and trifluoromethoxy; and R is a member selected from the group consisting of naphthyl, phenyl, and mono- and di-substituted phenyl wherein each substituent is chosen from the group consisting of fluorine, chlorine and bromine, alkyl having up to four carbon atoms, alkoxy and thioalkoxy each having up to three carbon atoms, trifluoromethyl and trifluoromethoxy.

2. A compound as claimed in claim 1 wherein X and Y are each hydrogen and R is phenyl.

3. A compound as claimed in claim 1 wherein X and Y are each hydrogen and R is fluorophenyl.

4. A compound as claimed in claim 1 wherein X and Y are each hydrogen and R is chlorophenyl.

5. A compound as claimed in claim 1 wherein X and Y are each hydrogen and R is dichlorophenyl.

6. A compound as claimed in claim 1 wherein X and Y are each hydrogen and R is alkylphenyl having up to four carbon atoms in the alkyl moiety.

7. A compound as claimed in claim 1 wherein X and Y are each hydrogen and R is alkoxyphenyl having up to three carbon atoms in the alkyl moiety.

8. A compound as claimed in claim 1 wherein X and Y are each hydrogen and R is trifluoromethylphenyl.

9. A compound as claimed in claim 1 wherein X and Y are each hydrogen and R is trifluoromethoxyphenyl.

10. A compound as claimed in claim 1 wherein X is bromine, Y is hydrogen and R is difluorophenyl.

11. A compound as claimed in claim 1 wherein X and Y are each chlorine, and R is phenyl.

12. A compound as claimed in claim 6 wherein R is tolyl.

13. A compound as claimed in claim 7 wherein R is anisyl.

No references cited.

HENRY R. JILES, Primary Examiner

C. M. SHURKO, Assistant Examiner

U.S. Cl. X.R.

260—453 AR, 553 A; 424—275